(12) United States Patent
Brown (10) Patent No.: US 8,314,946 B2
(45) Date of Patent: Nov. 20, 2012

(54) IMAGE RENDERING PRIOR TO MEDIA TYPE DETECTION

(75) Inventor: Gerald Maurice Brown, San Diego, CA (US)

(73) Assignee: Eastman Kodak Company, Rochester, NY (US)

( * ) Notice: Subject to any disclaimer, the term of this patent is extended or adjusted under 35 U.S.C. 154(b) by 1149 days.

(21) Appl. No.: 12/164,732

(22) Filed: Jun. 30, 2008

(65) Prior Publication Data

US 2009/0323086 A1 Dec. 31, 2009

(51) Int. Cl.
*G06F 3/12* (2006.01)

(52) U.S. Cl. .................................. 358/1.13; 358/1.1

(58) Field of Classification Search ........... 358/1.1–3.23
See application file for complete search history.

(56) References Cited

U.S. PATENT DOCUMENTS

| 6,830,398 | B2 | 12/2004 | Yokoi | |
|---|---|---|---|---|
| 2005/0099644 | A1* | 5/2005 | Nomoto et al. | 358/1.12 |
| 2009/0103934 | A1* | 4/2009 | Murakami | 399/45 |

* cited by examiner

*Primary Examiner* — Benny Q Tieu
*Assistant Examiner* — Marcellus Augustin
(74) *Attorney, Agent, or Firm* — Peyton C. Watkins (57) ABSTRACT

A method for selectively sequencing the rendering of an image for a print system includes determining a status field indicator for media type used in the print system; and pre-rendering an image according to the status field indicator, when the status field indicator includes a recognized media type. Additionally, the method identifies media type of a sheet of recording media that the image will be printed upon before rendering the image, when the status field indicator is absent of any recognized media type.

11 Claims, 10 Drawing Sheets

| MEDIA TYPE RENDERING | GLOSSY TYPE 1 | GLOSSY TYPE 2 | MATTE TYPE 1 | MATTE TYPE 2 | PLAIN PAPER |
|---|---|---|---|---|---|
| GLOSSY MODE 1 | GOOD | IQ IMPACT | IQ IMPACT | HEAD CRASH | HEAD CRASH |
| GLOSSY MODE 2 | GOOD | GOOD | GOOD | HEAD CRASH | HEAD CRASH |
| MATTE MODE 1 | IQ IMPACT | IQ IMPACT | GOOD | IQ IMPACT | HEAD CRASH |
| MATTE MODE 2 | IQ IMPACT | GOOD | GOOD | GOOD | HEAD CRASH |
| PLAIN PAPER MODE | IQ IMPACT | IQ IMPACT | IQ IMPACT | IQ IMPACT | GOOD |

FIG. 10

IMAGE RENDERING PRIOR TO MEDIA TYPE DETECTION

FIELD OF THE INVENTION

The present invention relates generally to preparing an image for printing, and more particularly to rendering an image for printing prior to detecting the type of media that will be printed on.

BACKGROUND OF THE INVENTION

In order to print high quality images on a recording medium it is important to know what kind of media is about to be printed. In the case of inkjet, for example, preferred recording conditions differ for different type of media, partly because different media interact differently with ink. For example, ink is able to wick along the paper fibers in plain paper, so that the spot of ink on the paper is enlarged and irregularly shaped relative to the drop of ink that strikes the paper. Media, which are specially formulated for high quality images, such as photographs, typically have an ink-receiving layer that absorbs the ink in a more controllable fashion, so that the spot size and shape are more regular. Because the colorants are trapped closer to the paper surface, and because a larger quantity of ink can be printed, (the associated carrier fluids being absorbed), an image printed on photographic print media has more vibrant colors than the same image printed on plain paper.

The appropriate amount of ink to use for printing an image on one type of media is different than printing on another type of media. If plain paper receives the same quantity of ink, more appropriately deposited in order to print a high-density image such as a photo that would be used for that same image on photographic print media, the plain paper may not be able to dry quickly enough. Even worse, the plain paper may cockle or buckle in the presence of excess ink, so that the printhead crashes into the printed image, thus smearing the image, but also possibly damaging the printhead. Even for two different types or grades of photographic print media, the amount of ink or number of passes to lay down an image for good tradeoffs in printing quality and printing throughput will be different. It is, therefore, important when receiving image-related data on a specific image to be printed, that the specific image be rendered appropriately for a specific media type that the image will be printed on. Image rendering is defined herein as determining data corresponding to: a) the appropriate amount of ink to deposit at particular pixel locations of the image; b) the number of multiple passes needed to lay the ink down on the media in light of ink-to-ink and ink-to-media interactions; and c) the type of pattern needed to produce the image. Image rendering is related to an entire printing job; for example, if a print job consists of five pages, typically all five pages would be rendered before printing the first page of the print job. The images printed on the different pages may be different images (e.g. successive pages of a document) or they may be the same image printed on another page (e.g. multiple copies of an image).

Various means are known in the art for providing information to the printer or to an associated host computer regarding the type of media (e.g. glossy media or matte media of various grades, or plain paper) that is in the input tray of the printer. For example, the user may enter information on media type. Alternatively, there may be a barcode printed on the backside of the media that is read to provide information on media type as a sheet of media is picked from the input tray and fed toward the printing mechanism. Alternatively, media characteristics such as optical reflectance can be used to distinguish among media types. Generally, the processes for automatic media type detection require several seconds (e.g. 5 to 6 seconds) to provide accurate media-related information on media type. For competitive printers today, it is important to achieve excellent print quality at fast printing throughput. In particular, a user may be dissatisfied if the time required to print the first page of a print job is excessive.

In addition to the time required for media detection, there is also additional time required for rendering of the image for printing. In conventional printers, the media type is detected first and then the image rendering is done specifically for that media type. This is a workable method, but it introduces additional time to print the first print of a print job, because the media type detection is done prior to the start of image rendering for the print job.

U.S. Pat. No. 6,830,398 discloses one method providing faster printing throughput while enabling automatic media type detection prior to controlling conditions in the printing operation. In '398 a load detector is provided for detecting that recording media has been loaded into the printer. In addition, there is provided a sensor, such as a reflective optical sensor, that can discriminate the type of media type after the media has been loaded in the input but before paper feeding starts. In '398, when the printer is turned on, or after media loading has been detected, the sensor obtains information about the media type, even before the first page of media is picked for feeding to print a print job. However, conventional printers do not have a sensor capable of reliably discriminating paper type as described in '398. For example, the sensor in '398 would have difficulty discriminating between matte paper versus plain paper. To date, it has been found that improved reliability of media type detection is provided when the sensor (such as an optical reflective sensor) and the media are moved relative to one another during the sensing operation. Thus, an improved method of printing is needed that provides reliable, automatic detection of media type, and fast throughput printing of images that are rendered appropriately, while using available sensors for media type detection.

SUMMARY OF THE INVENTION

The aforementioned need is met by providing a method for selectively sequencing the rendering of an image for a print system that determines a status field indicator for media type used in the print system; and pre-renders an image according to the status field indicator, when the status field indicator includes a recognized media type. Additionally, the method identifies media type of a sheet of recording media that the image will be printed upon before rendering the image, when the status field indicator is absent of any recognized media type.

A second embodiment of the invention provides a method for selectively sequencing the rendering of an image for a print system that includes the following steps:

a) determining a status field indicator for media type used in the print system;

b) pre-rendering an image according to the status field indicator, when the status field indicator includes a recognized media type;

c) identifying media type of a sheet of recording media that the image will be printed upon as the sheet of recording media is fed through the print system;

d) determining compatibility of image pre-rendering with identified media type for the sheet of recording media fed through the print system;

e) printing image upon the sheet of recording media where the identified media type is compatible with the image pre-rendering;

f) re-rendering the image where the identified media type is incompatible with the image pre-rendering; and g) identifying the media type of the sheet of recording media that the image will be printed upon before rendering the image, when the status field indicator is absent of any recognized media type.

A third embodiment of the invention provides a printing system that includes: a) a media tray; b) a media-type sensor for identifying media type of a sheet of recording media; c) a memory unit including a media type status field indicator; and d) an image processing unit. The image processing unit renders an image to prepare for printing on a sheet of recording media such that the image is pre-rendered according to the status field indicator when the status field indicator includes a recognized media type. When the status field indicator is absent of any recognized media type, the media-type sensor identifies the media type of a sheet of recording media that the image will be printed upon before rendering the image.

DETAILED DESCRIPTION OF THE INVENTION

Although the examples described herein refer to inkjet carriage printer systems, other types of printing systems can also benefit from the advantages of reliable media identification as provided by this invention. Such printing systems can include a variety of inkjet printing systems, for example pagewidth drop on demand printers, carriage drop on demand printers, and continuous inkjet printers, as well as other types of printing technologies such as dye sublimation printing systems or electrophotographic printing systems, for example.

Figure 1:
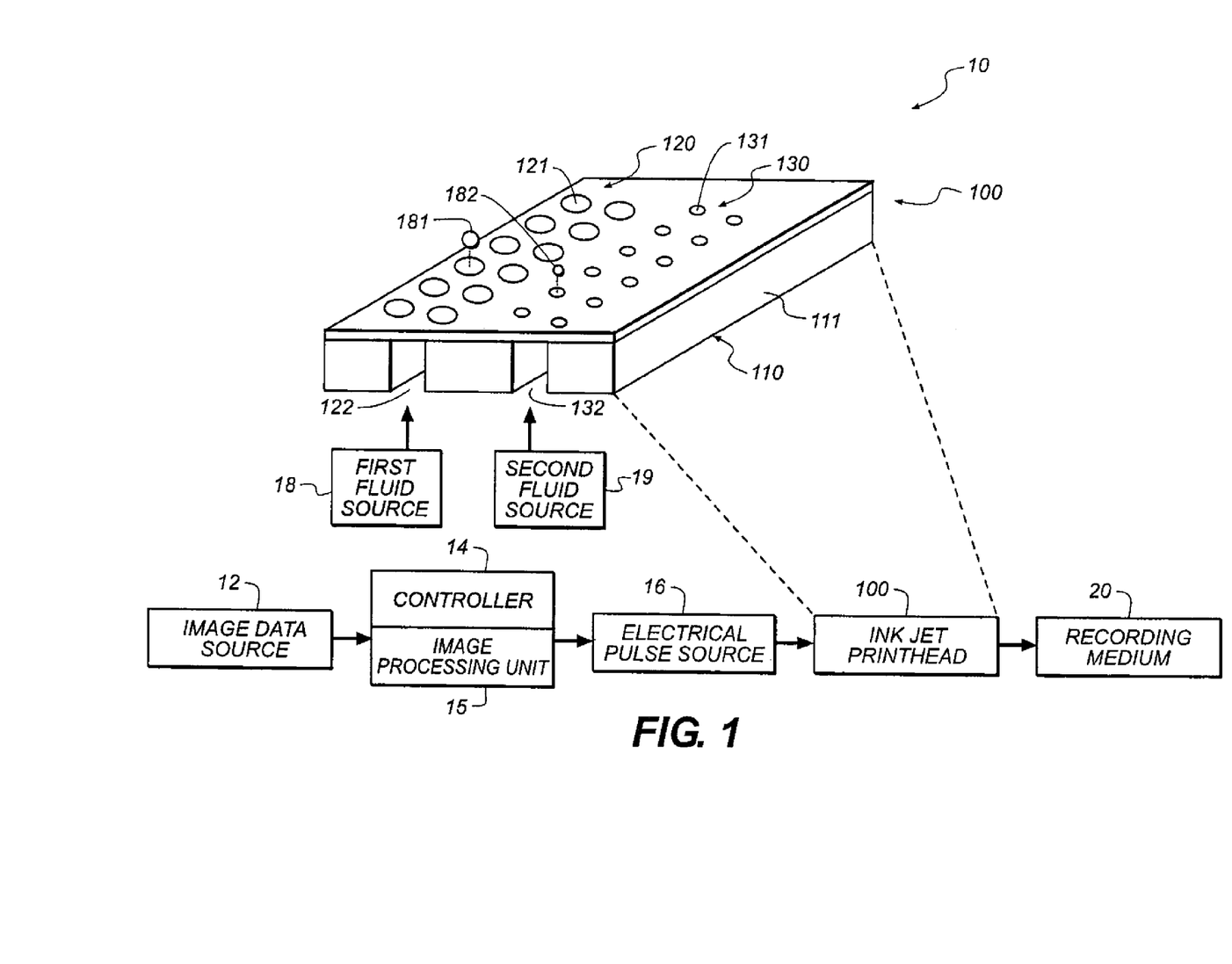
FIG. 1 is a schematic representation of an inkjet printer system.

Referring to FIG. 1, a schematic representation of an inkjet printer system 10 is shown, as described in U.S. Pat. No. 7,350,902, and incorporated by reference herein in its entirety. Printer system 10 includes a source 12 of image data, which provides data signals that are interpreted by a controller 14 as being commands to eject drops. Controller 14 includes an image processing unit 15 for rendering images for printing, and outputs signals to a source 16 of electrical energy pulses that are inputted to an inkjet printhead 100, which includes at least one printhead die 110. In the example shown in FIG. 1, there are two nozzle arrays 120, 130 for inkjet printhead 100. Nozzles 121 in the first nozzle array 120 have a larger opening area than nozzles 131 in the second nozzle array 130. In this example, each of the two nozzle arrays 120, 130 has two staggered rows of nozzles, each row having a nozzle density of 600 per inch. The effective nozzle density then in each array 120, 130 is 1200 per inch. If pixels on the recording medium were sequentially numbered along the paper advance direction, the nozzles from one row of an array would print the odd numbered pixels, while the nozzles from the other row of the array would print the even numbered pixels. In fluid communication with each nozzle array is a corresponding ink delivery pathway. Ink delivery pathway 122 is in fluid communication with nozzle array 120, and ink delivery pathway 132 is in fluid communication with nozzle array 130. Portions of fluid delivery pathways 122 and 132 are shown in FIG. 1, as openings through printhead die substrate 111. One or more printhead die 110 will be included in inkjet printhead 100, but only one printhead die 110 is exemplarily shown in FIG. 1. The printhead die is arranged on a support member as discussed below relative to FIG. 2. In FIG. 1, a first ink source 18 supplies ink to first nozzle array 120 via ink delivery pathway 122, and a second ink source 19 supplies ink to second nozzle array 130 via ink delivery pathway 132. Although distinct ink sources 18 and 19 are shown, in some applications it may be beneficial to have a single ink source supplying ink to both nozzle arrays 120 and 130 via ink delivery pathways 122 and 132 respectively. Also, in some embodiments, fewer than two nozzle arrays are included on printhead die 110; in other embodiments more than two nozzle arrays are used. In some embodiments, all nozzles on a printhead die 110 may be the same size, rather than having multiple sized nozzles on a printhead die.

Not shown in FIG. 1, are the drop forming mechanisms associated with the nozzles. Drop forming mechanisms can be of a variety of types, some of which include a heating element to vaporize a portion of ink and thereby cause ejection of a droplet, or a piezoelectric transducer to constrict the volume of a fluid chamber and thereby cause ejection, or an actuator which is made to move (for example, by heating a bilayer element) and thereby cause ejection. In any case, electrical pulses from pulse source 16 are sent to the various drop ejectors according to the desired deposition pattern. In the example of FIG. 1, droplets 181 ejected from nozzle array 120 are larger than droplets 182 ejected from nozzle array 130, due to the larger nozzle opening area. Typically other aspects of the drop forming mechanisms (not shown) associated respectively with nozzle arrays 120 and 130 are also sized differently in order to optimize the drop ejection process for the different sized drops. During operation, droplets of ink are deposited on a recording media 20.

Figure 2:
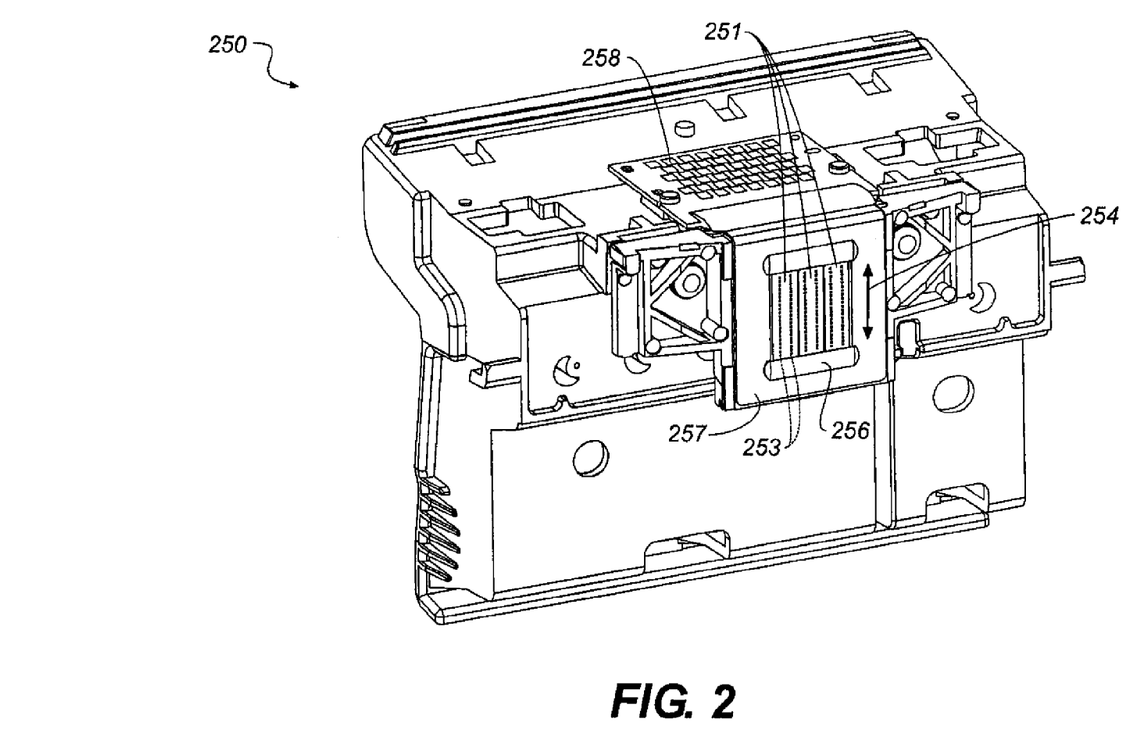
FIG. 2 is a perspective view of a portion of a print head chassis.

FIG. 2 shows a perspective view of a portion of a printhead chassis 250, which is an example of an inkjet printhead 100. Printhead chassis 250 includes three printhead die 251 (similar to printhead die 110), each printhead die containing two nozzle arrays 253, so that printhead chassis 250 contains six nozzle arrays 253 altogether. The six nozzle arrays 253 in this example may be each connected to separate ink sources (not shown in FIG. 2); such as cyan, magenta, yellow, text black, photo black, and a colorless protective printing fluid. Each of the six nozzle arrays 253 is disposed along direction 254, and the length of each nozzle array along direction 254 is typically on the order of 1 inch or less. Typical lengths of recording media are 6 inches for photographic prints (4 inches by 6 inches), or 11 inches for 8.5 by 11 inch paper. Thus, in order to print the full image, a number of swaths are successively printed while moving printhead chassis 250 across the recording media. Following the printing of a swath, the recording media is advanced.

Also shown in FIG. 2 is a flex circuit 257 to which the printhead die 251 are electrically interconnected, for example by wire bonding or TAB bonding. The interconnections are covered by an encapsulant 256 to protect them. Flex circuit 257 bends around the side of printhead chassis 250 and connects to connector board 258. When printhead chassis 250 is mounted into the carriage 200 (see FIG. 3), connector board 258 is electrically connected to a connector (not shown) on the carriage 200, so that electrical signals may be transmitted to the printhead die 251.

Figure 3:
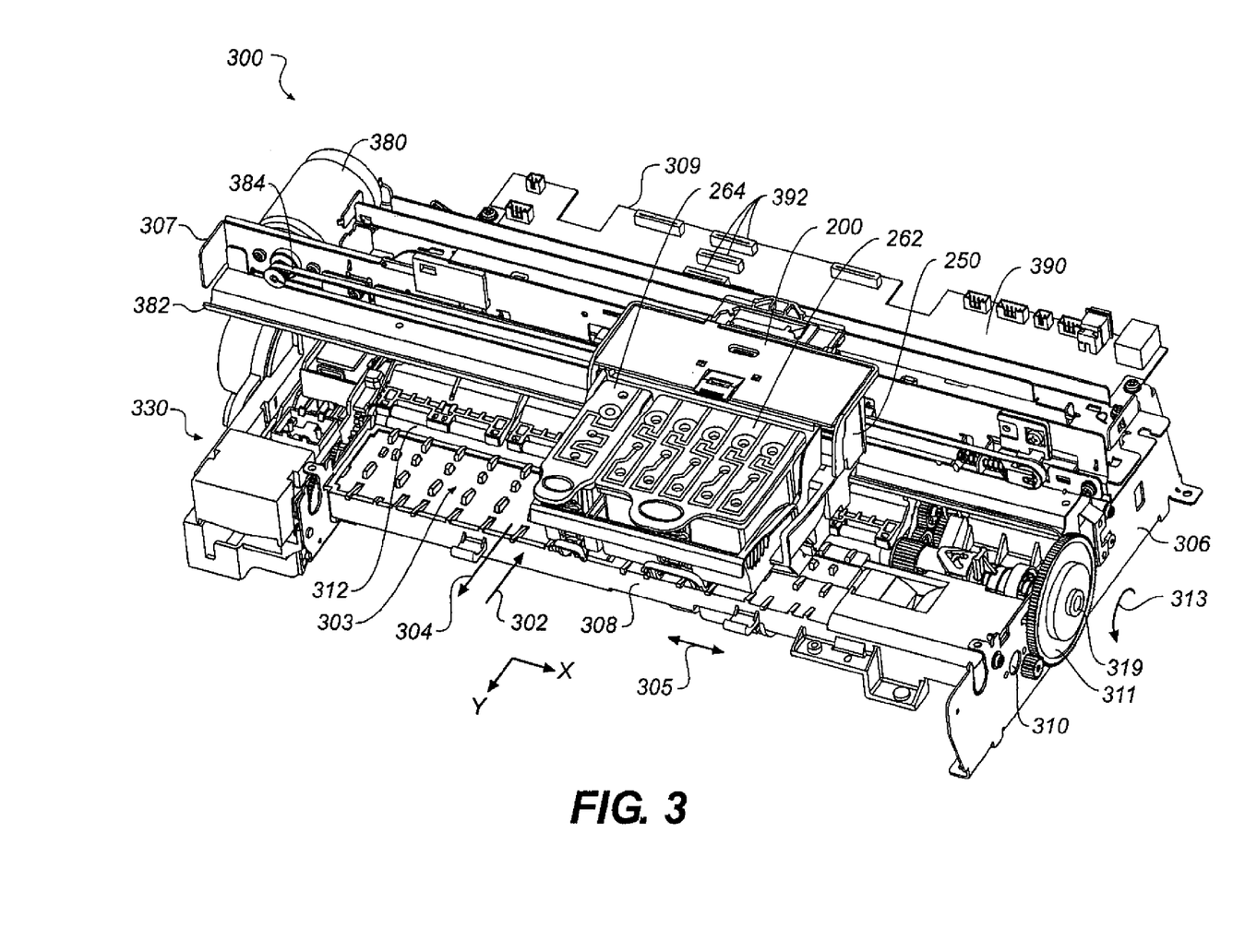
FIG. 3 is a perspective view of a portion of a carriage printer.

FIG. 3 shows a portion of a carriage printer. Some of the parts of the printer have been hidden in the view shown in FIG. 3 so that other parts may be more clearly seen. Printer chassis 300 has a print region 303 across which carriage 200 is moved back and forth in direction 305 along the X axis, between the right side 306 and the left side 307 of printer chassis 300, while drops are ejected from printhead die 251 on printhead chassis 250 that is mounted on carriage 250. Carriage motor 380 moves belt 384 to move carriage 200 along carriage guide rail 382. Printhead chassis 250 is mounted in carriage 200, and ink supplies 262 and 264 are mounted in the printhead chassis 250. The mounting orientation of printhead chassis 250 is rotated relative to the view in FIG. 2, so that the printhead die 251 (shown in FIG. 2) are located at the bottom side of printhead chassis 250, the droplets of ink being ejected downward onto the recording media in print region 303 in the view of FIG. 3. Ink supply 262, in this example, contains five ink sources cyan, magenta, yellow, photo black, and colorless protective fluid, while ink supply 264 contains the ink source for text black. Paper, or other recording media, (sometimes generically referred to as paper herein) is loaded, in this example, along paper load entry direction 302 at the front portion 308 of printer chassis 300. A variety of rollers are used to advance the recording media through the printer, as shown schematically in the side view of FIG. 4. In this example, a pickup roller 320 moves the top sheet 371 of a stack 370 of paper or other recording media in the direction of arrow 302. A turn roller 322, toward the rear portion 309 of the printer chassis 300, acts to move the paper around a C-shaped path (in cooperation with a curved rear wall surface) so that the paper continues to advance along direction arrow 304 from the rear direction 309 of the printer. The paper is then moved by feed roller 312 and idler roller(s) 323 to advance along the Y axis 9 in FIG. 3) and across print region 303, and from there to a discharge roller 324 and star wheel(s) 325 so that a paper, printed with an image, exits along direction 304. Feed roller 312 includes a feed roller shaft 319 along its axis, and feed roller gear 311 is mounted on the feed roller shaft 319. Feed roller 312 can include of a separate roller mounted on feed roller shaft 319, or a thin high friction coating on feed roller shaft 319. The motor that powers the paper advance rollers is not shown in FIG. 1, but the hole 310 at the right side 306 of the printer chassis 300 (shown in FIG. 3) is where the motor gear (not shown) protrudes through in order to engage feed roller gear 311, as well as the gear for the discharge roller (not shown). For normal paper pick-up and feeding, it is desired that all rollers rotate in forward direction 313. Toward the left side 307 in the example chassis 300 shown in FIG. 3 is the maintenance station 330. Toward the rear portion 309 of the printer in chassis 300 is located electronics board 390, which includes cable connectors 392 for communicating via cables (not shown) to the printhead carriage 200 and from there to the printhead chassis 250. Also mounted on the electronics board 390 are motor controllers for the carriage motor 380 and for the paper advance motor, a processor and/or other control electronics (shown schematically as 14 and 15 in FIG. 1) for controlling the printing process, including image processing, and an optional connector for a cable to a host computer. The image processing can be accomplished via software, firmware or hardware; for example ASICs or other circuitry.

Figure 4:
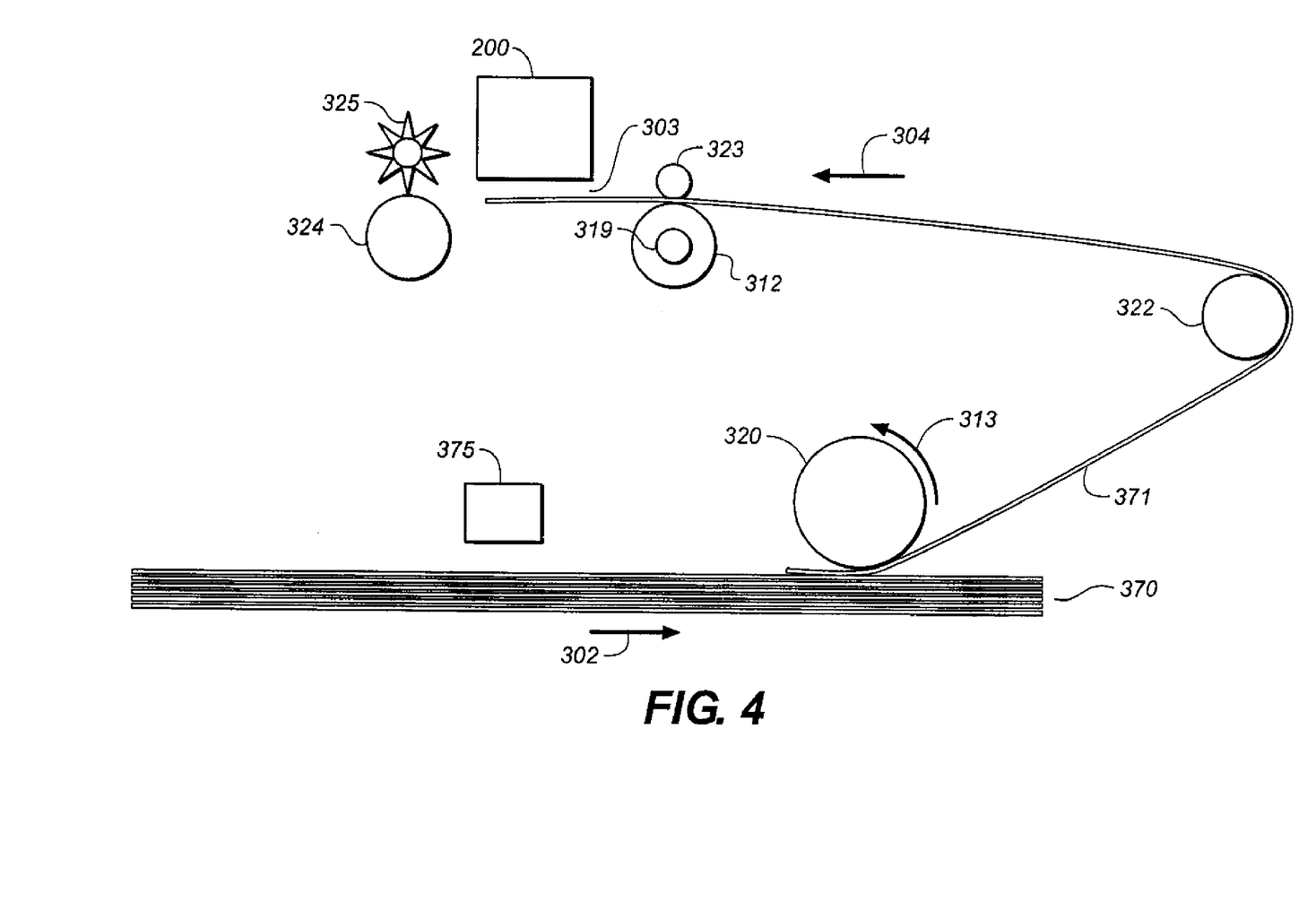
FIG. 4 is a schematic side view of a paper path in a carriage printer.

Also shown in FIG. 4 is backside media sensor 375, which is used to detect media identification markings on the backside of the top sheet of recording media 371 prior to printing. The backside of the recording media is defined as the side of the sheet that is not intended for printing. Media manufacturers identify specialty media such as those having glossy, luster, or matte finishes with marks on the backside to indicate different quality media. While the backside media sensor 375 is shown in FIG. 4 as being located upstream of pickup roller 320, other locations are possible. A typical backside media sensor 375, for example, includes an LED and a photosensor. The LED emits light, the emitted light is reflected from the backside of the top sheet 371 of media and reflections are detected by the photo sensor as the media moves past the sensor 375 at a substantially constant velocity. The light signal reflected from the manufacturer's marking is different from the light signal on the rest of the backside of the media, so that different spacings of identification bars (for example) may be detected as different spacings of peaks or valleys of the photosensor signal.

While the backside media sensor 375 is configured to work well with print media designed for the printer, a user may use a variety of media from other sources and the backside markings (if any) may not be recognized by the printer. Therefore, it is useful to have another means of distinguishing different media types. Thus, good printing may be provided for generic media of glossy, matte, plain or other types—perhaps not as optimized as media specified by the manufacturer, but still better than if no identification of generic media type had been made. In particular, a sensor (such as a reflective optical sensor) may be mounted on carriage 200. When a sheet of recording media has been fed into the print zone region where the carriage 200 is located, the characteristics of the signals may be used to identify the type of recording medium, as described for example in co-pending application U.S. patent application Ser. No. 12/037,970, filed on Feb. 27, 2008. It can take several seconds to reliably identify the type of recording media about to be printed. This media identification time can include moving the sheet of media into the print zone, receiving a photosensor signal corresponding to various locations on the media as the media and sensor on the carriage 200 are moved relative to one another, analyzing the photosensor signal, and correlating the analyzed photosensor signal with a media type.

In embodiments of the present invention, image rendering for a print job is selectively done prior to or at the same time as detection of the of the media type of the next sheet of media to be fed from the tray. This sequence of rendering the image prior to or at the same time as automatic media detection is also called pre-rendering herein. Pre-rendering the image can typically save about 5 seconds in the time required to print the first page of the print job. Because users typically load a stack of media of a single type into a media tray, it is generally a good assumption that the next sheet of media will be the same type as the previous sheet.

Pre-rendering, in this invention, makes use of this assumption that the next sheet is the same type as the previous sheet. However, if more media is loaded into the tray, then confidence decreases that the top sheet of media is the same type as the sheet that had been previously detected. If the image is pre-rendered and the pre-rendering is found to be incompatible with the type of media that the image will actually be printed on, then the pre-rendered image data must be discarded or purged from printer memory and the image must be re-rendered for the type of media that will actually be used.

The process of pre-rendering the image, discarding or purging pre-rendered image data, and re-rendering the image can take longer than the several seconds that would be saved if the pre-rendering is compatible with the actual media type. In some embodiments, discarding the pre-rendered image data takes substantially the same amount of time as it would to print the image—which can be a minute or more. In other embodiments, the electronics and the data processing method allows purging the pre-rendered image data at a faster rate than the rate at which image data is used during printing, but it still typically takes longer than the amount of time that would be saved if the pre-rendering is compatible with the actual media type.

Because incompatible pre-rendering actually wastes time rather than saving time, two measures are taken in embodiments of this invention. First of all, if a media load event is detected as probably having occurred, the assumption that the next sheet of media is the same type as the previously detected sheet of media is not made, and the sequence of image rendering is changed to the more standard sequence of detecting the media type of the next sheet, and then rendering the image. Examples of detecting probable media load events include detecting that the amount of media in the input tray has significantly changed, or that the size of the media in the tray has changed, or that the media input tray has been moved into a media load position, then the likelihood of the media type having been changed increases to the point where image pre-rendering before media type detection would likely waste more time than it might save. Secondly, it has been observed that image rendering for some media types produces acceptable images even if used to print the image on other particular different types of media. Therefore, a compatibility table may be created to indicate whether or not re-rendering needs to be done if a different type of media is identified than the media type that was assumed in pre-rendering the image.

Figure 5:
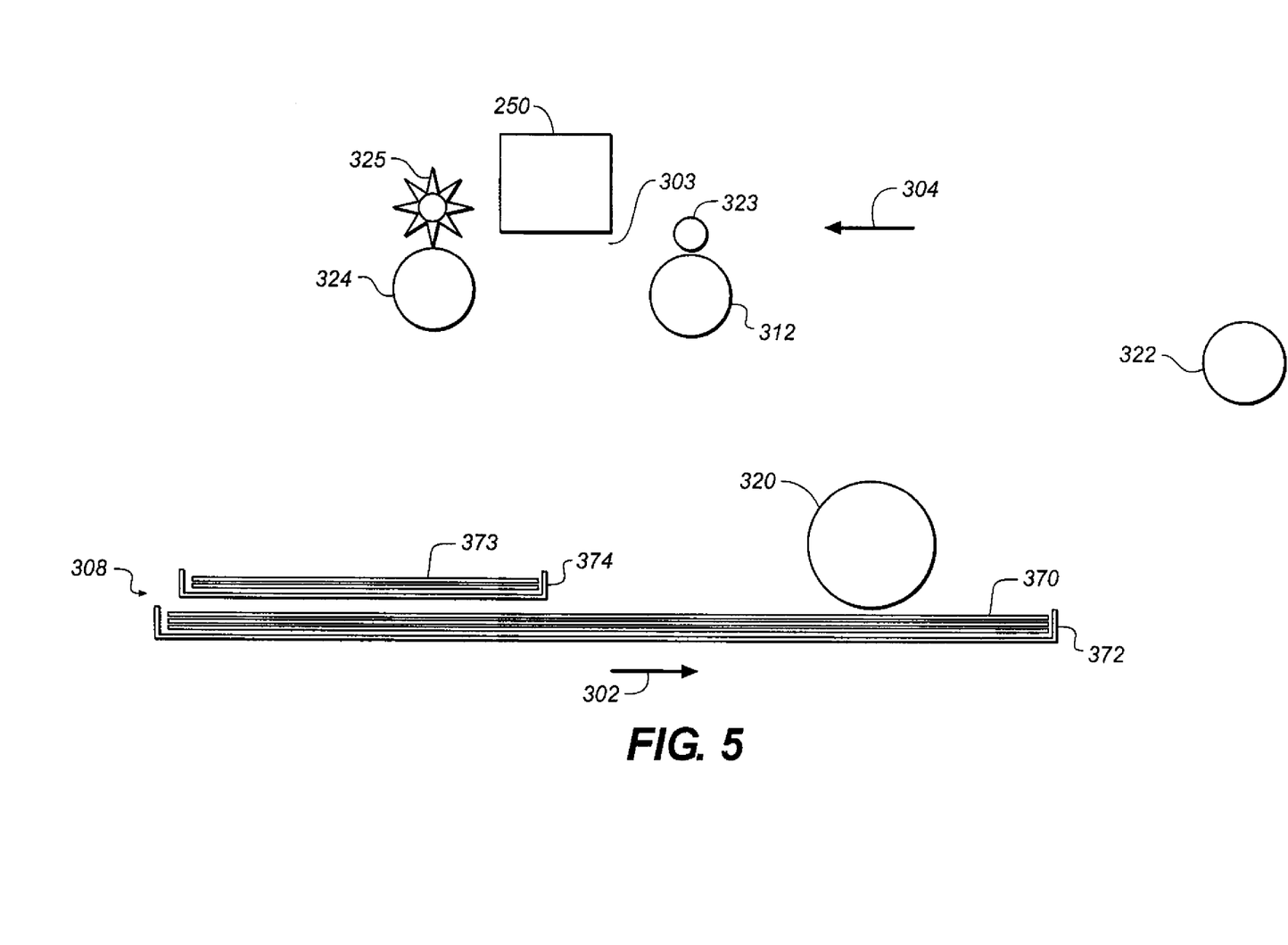
FIG. 5 is a schematic side view of a paper path in a carriage printer, including a main media tray, and a photo media tray located in a standby position.
Figure 6:
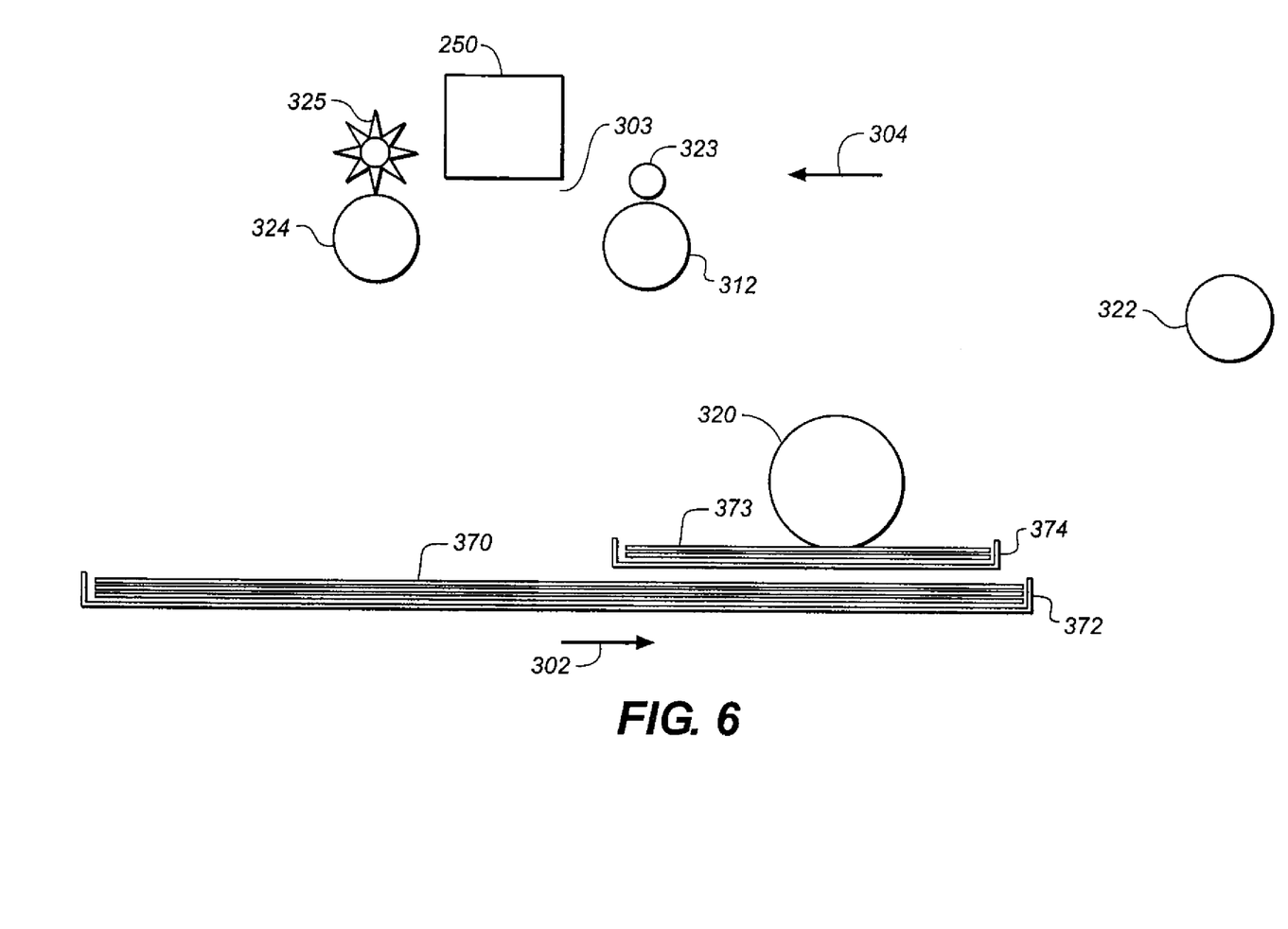
FIG. 6 is a schematic side view of a paper path in a carriage printer, including a main media tray, and a photo media tray located in a printing position.

In some carriage printers there is both a main media tray for a standard sized sheet of paper, as well as a smaller media tray for holding photo media, as shown, for example, in FIGS. 5 and 6. In both figures there is a paper stack 370 in main paper tray 372 and there is a stack of photo media 373 in photo media tray 374. The sheets in paper stack 370 are of a larger size (for example, 8.5"×11") compared to the sheets in paper stack 373 (for example, 4"×6"), and photo media tray 374 is not as long as main paper tray 372. In the example shown schematically in FIG. 5, the photo media tray 374 is in a standby position near the front portion 308 of the printer. With the photo media tray 374 in this position, a pick roller 320 is able to contact the top sheet in paper stack 370 in the main tray 372. Also in the standby position of the photo media tray 374, additional photo media 373 can be loaded, while photo media tray 374 is in standby position near the front portion 308 of the printer. In FIG. 6, the photo tray 374 has been moved along direction 302 to its printing position. When the photo media tray 374 is in the printing position, the pickup roller 320 is able to contact the top sheet in photo media stack 373. In some embodiments, the pickup roller is mounted on a pivotable pick arm, which is able to be moved up or down to rest on the top sheet of media, whichever media tray is beneath it.

In some embodiments, a recording media load event can be detected for the photo paper tray 374 by detecting whether photo media tray 374 has been moved into its standby forward position. In some embodiments, a media load event can be detected for the paper tray 372 or the photo media tray 374 by use of a media stack height detector (not shown), or a media size detector (not shown).

Figure 7:
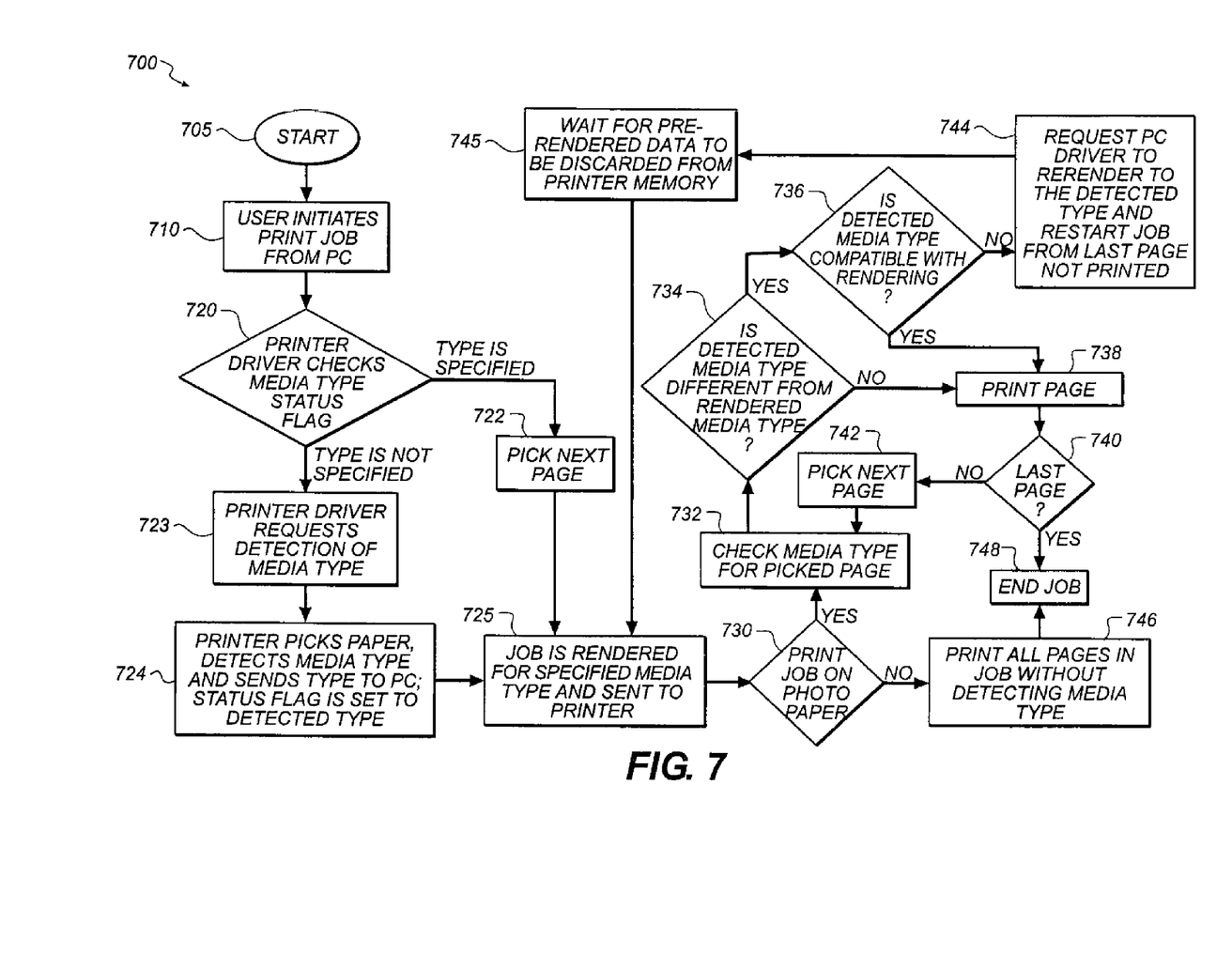
FIG. 7 is a flow diagram for rendering an image for a print job initiated from an associated host computer.

Flow diagram 700, shown in FIG. 7, is for the case of rendering an image prior to automatic media detection for a user initiating a printing job from an associated host computer. Upon starting the process 705, a user initiates a print job from the host computer 710. A printer driver checks the media type status flag in operation 720. (For printers having multiple media input trays, a media status flag can be stored in printer memory corresponding to each media input tray.) If a media type is specified, the next page is picked in operation 722, and a print job is rendered for specified media type and sent to the printer in operation 725. If a media type is not specified, operation 723 has the printer driver to request detection of the media type (e.g., using a sensor that will sense a marking, such as a barcode, or a media-characteristic, such as an optical reflectance). Operation 724 detects the media type and sends a signal to the printer, while setting the status flag to indicate the detected media type before operation 725 is performed for the specified media type.

Operation 730 decides whether a print job on a photo paper is requested based on the status field or the detected media type. If a print job on a photo paper is requested, operation 732 checks top sheet of recording media for its media type. In operation 734 a comparison is made between the detected media type for the top sheet of recording media and the rendered media type (i.e. the type of media for which the image was rendered in operation 725). If there is no difference in detected media type and rendered media type, operation 738 prints an image upon the page. If there is a difference in detected media type and rendered media type, operation 736 decides whether the detected media type is compatible with the selected rendering; if it is compatible, operation 738 prints an image upon the page. If the detected media type is not compatible with the selected rendering, operation 744 requests the host computer driver to re-render the image according to the detected media type and restart the print job from the last page not printed. It may be necessary to wait for the pre-rendered image data to be discarded from printer memory, as indicated in step 745.

Figure 10:
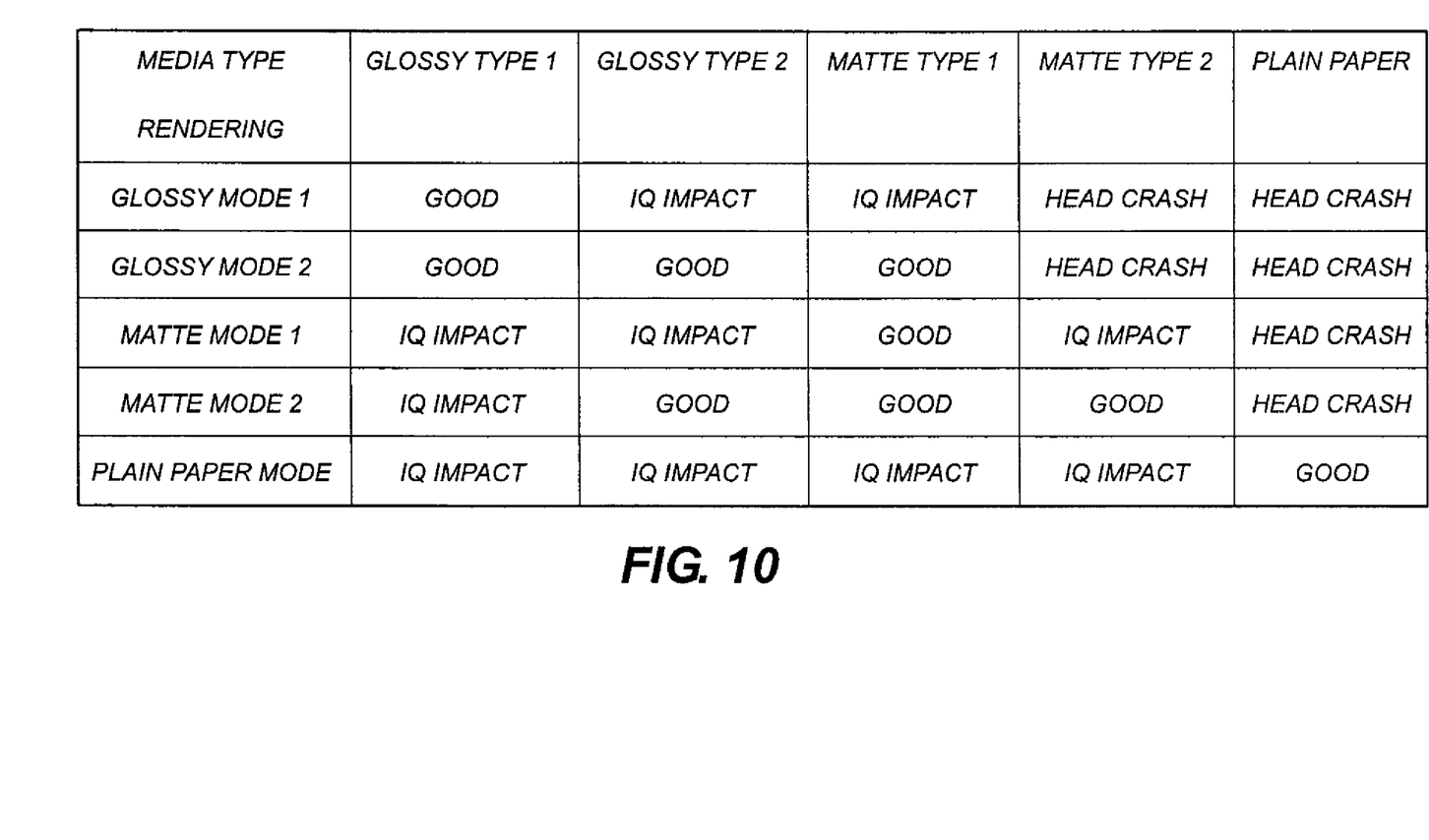
FIG. 10 is a look-up table for indicating compatibility of the detected media type with the selected image rendering.

Operation 736, deciding whether the detected media type is compatible with the selected rendering, can be performed, for example, using a look-up table which has previously been stored in printer memory. In the look-up table 1000 example shown schematically in FIG. 10, media types are indicated in rows and image rendering is indicated in columns. For cases where the image rendering matches the media type (i.e. for cells along the diagonal from upper left to lower right in look-up table 1000), print quality will be good, because the image has been rendered for that media type. In some other cases, for example for image rendering according to glossy media type 2, but printing the image on glossy media type 1, look-up table 1000 indicates that the image quality will still be good. Thus, even though an image is rendered for glossy media type 2, printing on glossy media type 1 is compatible with that rendering. Similarly, even though an image is rendered for matte media type 2, printing on matte media type 1 is compatible with that rendering. In some other cells of look-up table 1000, it is indicated that there would be an image quality (IQ) impact if an image were rendered for one assumed type of media, but printed on another type of media. For these combinations in this example, the rendering would be considered incompatible and the image would need to be re-rendered according to the actual media type to be printed on. In other cells, particularly for plain paper in the column at the right, if any image rendering is used other than that appropriate for plain paper, excessive ink would be deposited on the plain paper. For a high-density image, there would be risk of the printhead crashing into the cockled paper, so again, the pre-rendering of the image would be considered incompatible with the actual paper type, and the image would need to be re-rendered.

Upon printing a page in operation 738, the method inquires whether the last page has been printed in operation 740. If the last page has not been printed, then a subsequent sheet of recording media is picked in operation 742, and checked for its media type in operation 732. If the last page has been printed, then the print job is ended by operation 748.

The aforementioned operations were for a print job on photo media, however, where a print job on photo media is not requested, operation 746 prints all pages for a specified print job without detecting media type. Upon completion of printing, the print job is ended by operation 748.

Figure 8:
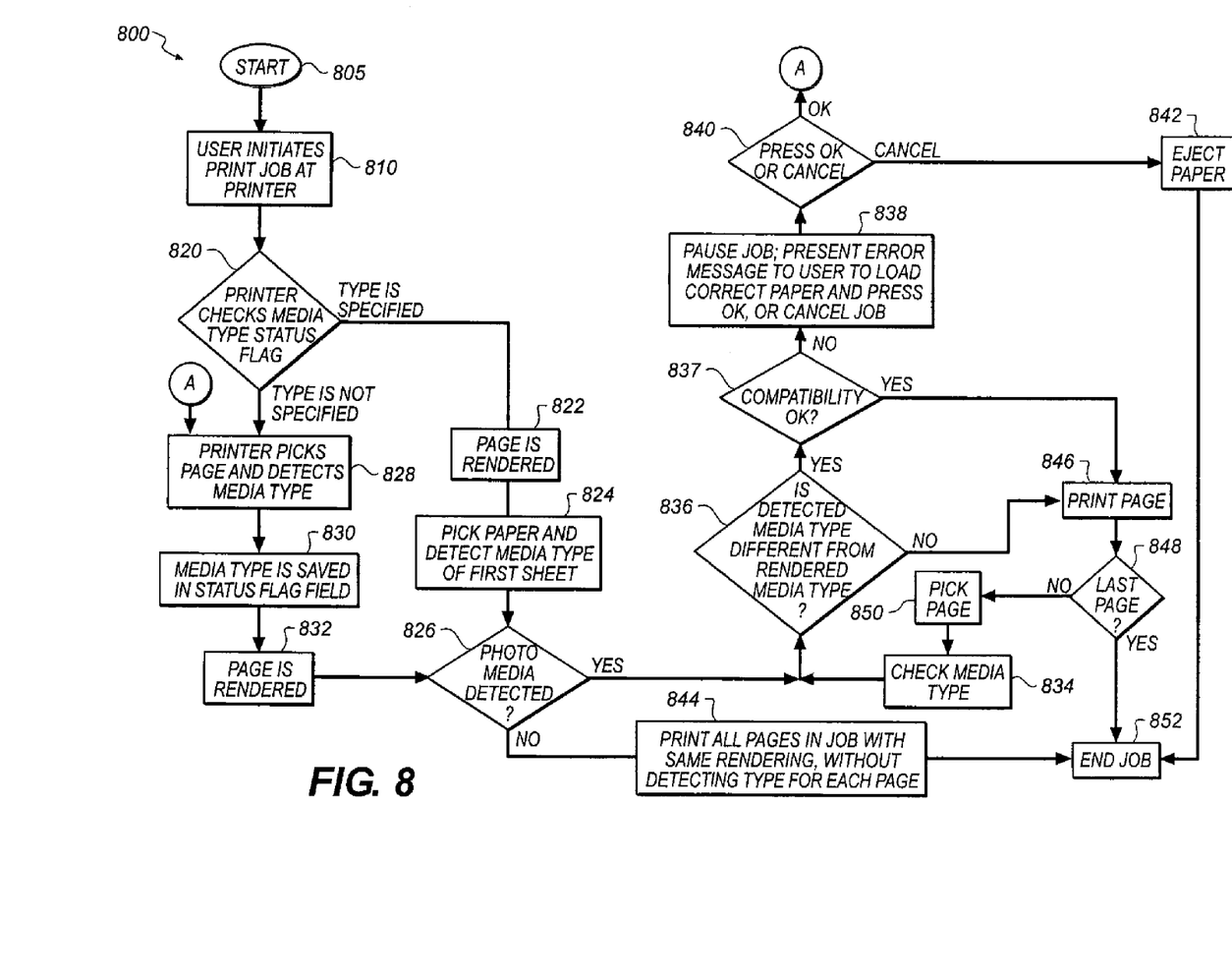
FIG. 8 is a flow diagram for rendering an image for a print job initiated at the printer.

The flow diagram 800 shown in FIG. 8 is for exemplarily illustrating the case of rendering an image prior to automatic media detection for a user initiating a printing job at the printer, where the printer is independent from an associated host computer (i.e., stand alone mode). Upon starting the process 805, a user initiates a print job at the printer 810. A printer driver checks media type status flag in operation 820. If the status flag indicates a specified media type, a page is rendered for specified media type and sent to the printer in operation 822. The first sheet of recordable media is picked in operation 824, and its media type is detected. Operation 826 decides whether photo media has been detected based on input from operation 824 containing the detected media type of the first sheet of recording media.

If the media type is not specified, operation 828 has the printer pick a page and detects its media type. The detected media type is saved in a status flag field in operation 830. The page is rendered according to the detected media type in operation 832. Subsequent to rendering of the page, operation 826 inquires whether photo media has been detected. If photo media has not been detected, operation 844 prints all pages in a print job with the same rendering requirements, and does so without detecting media type for each individual page within the print job. In other words, if plain paper is detected, then the print job is rendered for plain paper, and all pages of the job are printed with image rendering for plain paper, without checking the type of media for subsequent pages in the print job. Upon completion of printing, the print job is ended by operation 852.

Operation 836 determines whether the detected media type is different from rendered media type subsequent to determining that the detected media is photo media. If the detected media type is different from rendered media type, operation 837 checks the compatibility of the detected media type and the rendered media type, e.g. by using a look-up table as described previously relative to FIG. 10. If they are compatible, the page is printed at operation 846. If they are not compatible, operation 838 pauses the print job and presents an error message to the user imploring the user to load correct paper/recording media and to press OK button or cancel the print job. Optionally, in an alternative embodiment where the printer has sufficient resources, the image can be re-rendered at this point without ejecting paper and without requiring the user to load the right paper and press OK or cancel the print job. Operation 840 determines whether the print job has been OK'd or canceled. If the print job is OK'd, operation 828 is employed to have the printer pick a page and detect media type for said page. If the print job is given a cancel command then operation 842 ejects the recording media prior to operation 852 ending the print job. At operation 836, if the detected media is not different from the rendered media type, the page is printed by operation 846. For each page printed by operation 846, an inquiry by operation 848 has to be done to determine whether the last page for printing has arrived. If the last page has not arrived, operation 850 picks a different page before operation 834 checks media type. If the last page has arrived, operation 852 ends the print job, and a status flag is set to last known printed media type in operation 854.

Figure 9:
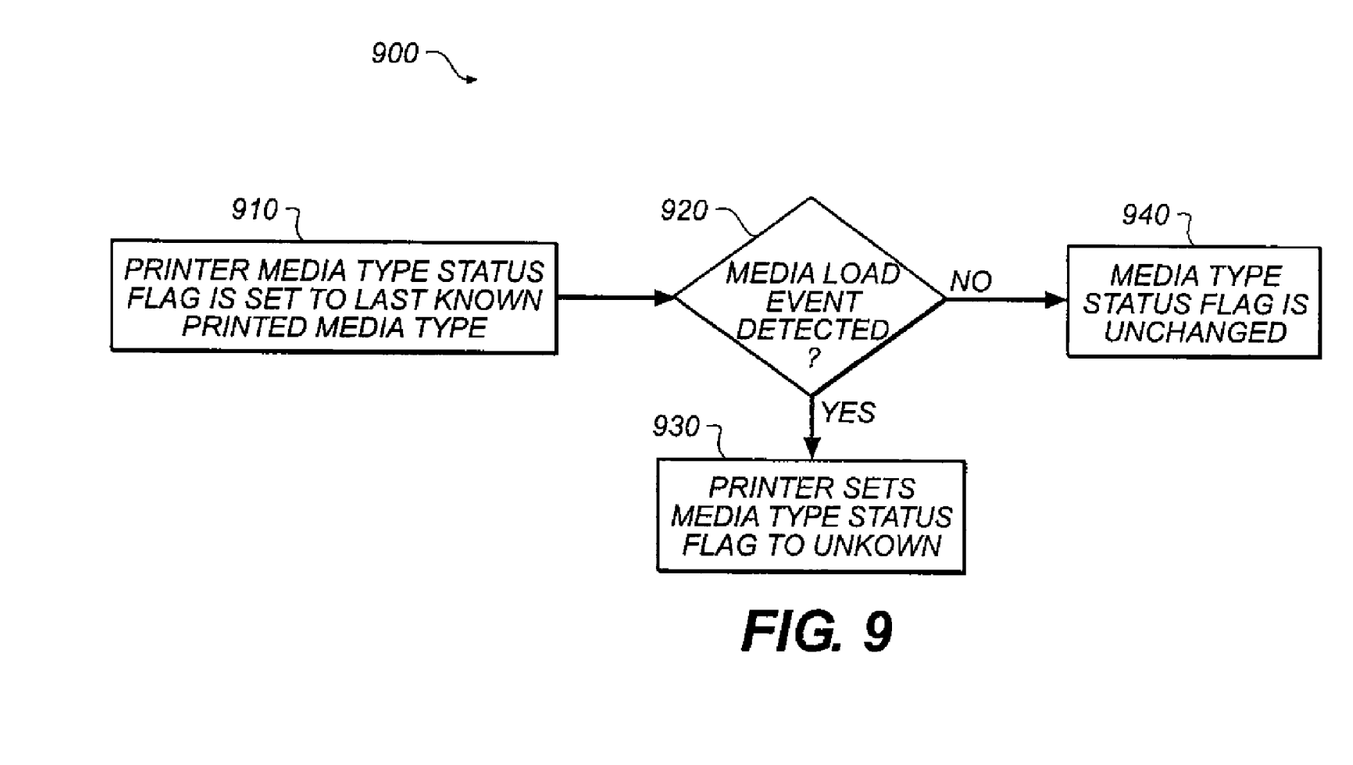
FIG. 9 is a flow diagram for setting the media type status flag in the status field.

The flow diagram 900 shown in FIG. 9 illustrates setting the media type status flag in the status field to unknown, if a probable media load event has been detected. Hence, the system will be initially unsure what type of recording media has been loaded. Operation 910 has the printer's media type status flag set to the last known printed media type. For example, if photo media was last detected, the status flag will be set to correspond to photo media. Operation 920 detects whether a media load event has occurred, that is has recording media recently been loaded into the printer? If no media load event has occurred, operation 940 keeps the media type status flag unchanged. If a media load event has occurred, operation 930 has the printer set the media type status flag to unknown. Optional alternatives to the process for setting the media type status flag may depend on the method and accuracy of detecting the media load event. For example, if a load event is detected by tray movement, or by a relatively imprecise detector of media quantity, the process described above would be implemented. However, if the detector of media quantity is sufficiently accurate and the media quantity is increased, the status flag would be set to unknown until the picking of the first sheet. When a number of first sheets are subsequently picked so that that the amount of media is the same as it was before the load event was detected, the status flag value could be reset to its previous value. Also, if a sufficiently accurate detector indicates that the quantity of media has decreased, the user could be queried (for example, on a display on the printer) whether the paper type was changed or a few sheets simply removed from the tray.

The invention has been described in detail with particular reference to certain preferred embodiments thereof, but it will be understood that variations and modifications can be effected within the spirit and scope of the invention.

| PARTS LIST | |
| --- | --- |
| 10 | Inkjet printer system |
| 12 | Image data source |
| 14 | Controller |
| 15 | Image processing unit |
| 16 | Electrical pulse source |
| 18 | First fluid source |
| 19 | Second fluid source |
| 20 | Recording medium |
| 100 | Ink jet print head |
| 110 | Ink jet print head die |
| 111 | Substrate |
| 120 | First nozzle array |
| 121 | Nozzle in first nozzle array |
| 122 | Ink delivery pathway for first nozzle array |
| 130 | Second nozzle array |
| 131 | Nozzle in second nozzle array |
| 132 | Ink delivery pathway for second nozzle array |
| 181 | Droplet ejected from first nozzle array |
| 182 | Droplet ejected from second nozzle array |
| 200 | Carriage |
| 250 | Print head chassis |
| 251 | Print head die |
| 253 | Nozzle array |
| 254 | Nozzle array direction |

-continued

PARTS LIST

| | |
|---|---|
| 256 | Encapsulant |
| 257 | Flex circuit |
| 258 | Connector board |
| 262 | Multi-chamber ink supply |
| 264 | Single chamber ink supply |
| 300 | Printer chassis |
| 302 | Paper load entry |
| 303 | Print region |
| 304 | Paper exit |
| 306 | Right side of printer chassis |
| 307 | Left side of printer chassis |
| 308 | Front portion of printer chassis |
| 309 | Rear portion of printer chassis |
| 310 | Hole for paper advance motor drive gear |
| 311 | Feed roller gear |
| 312 | Feed roller |
| 313 | Forward rotation of feed roller |
| 319 | Feed roller shaft |
| 320 | Pickup roller |
| 322 | Turn roller |
| 323 | Idler roller |
| 324 | Discharge roller |
| 325 | Star wheel |
| 330 | Maintenance station |
| 370 | Stack of media |
| 371 | Top sheet |
| 372 | Main paper tray |
| 373 | Photo paper stack |
| 374 | Photo paper tray |
| 375 | Backside media sensor |
| 380 | Carriage motor |
| 382 | Carriage rail |
| 384 | Belt |
| 390 | Printer electronics board |
| 392 | Cable connectors |
| 7xx | Process steps for print job initiated from host computer |
| 8xx | Process steps for print job initiated at printer |
| 9xx | Process steps for setting media type status flag |
| 1000 | Look-up table for compatibility of detected media type and rendering |

What is claimed is:

1. A method for selectively sequencing the rendering of an image for a print system, comprising the steps of:
    a) determining a media type status flag for media type previously used in the print system;
    b) feeding a sheet of media into the print system;
    c) when the media type status flag includes a recognized media type, rendering an image according to the media type status flag, thereby forming a pre-rendered image;
    d) after pre-rendering the image, then identifying a media type for the sheet of media to confirm whether the media type of the sheet of media is compatible with the pre-rendering;
    e) if the identified media type of the sheet of media is not compatible, then discarding the pre-rendering, and rendering the image according to the identified media type; and
    f) when the media type status flag is absent of any recognized media type, identifying the media type upon which the image will be printed and then rendering the image.

2. The method claimed in claim 1, wherein for a multi-sheet print job each sheet is rendered and then each sheet is identified by the media type upon which the image will be printed so that the sheets of recording media include different pre-rendered images.

3. The method claimed in claim 1, further comprising the step of determining whether the media tray has moved since a previous sheet of recording media was fed from the media tray into the printing system.

4. The method claimed in claim 1, further comprising the step of detecting a change in the amount of recording media in the media tray.

5. The method claimed in claim 1, further comprising associating a change in the media type of the recording media in the media tray where a change relative to the media tray is detected.

6. The method claimed in claim 1, wherein the printing system includes a first media tray and a second media tray.

7. The method claimed in claim 6, wherein the media type status flag is flagged differently when the recording media is fed from the first media tray than when the recording media is fed from the second media tray.

8. The method claimed in claim 1, further comprising the step of checking of compatibility of the media type when the media type status flag indicates media type suitable for photo media.

9. The method claimed in claim 1, wherein determining compatibility of the image pre-rendering with identified media type for the sheet of recording media fed through the print system further comprises the step of checking a look-up table.

10. A printing system, comprising:
    a) a media tray;
    b) a media-type sensor for identifying media type of a sheet of recording media;
    c) a memory unit including a media type status flag; and
    d) an image processing unit that:
        renders an image to prepare for printing on a sheet of recording media such that the image is rendered according to the status field indicator when the media type status flag includes a recognized media type thereby forming a pre-rendered image;
        after rendering the image, then identifying a media type for the sheet of recording media to confirm whether the media type of the sheet of recording media is compatible with the pre-rendering;
        if the identified media type of the sheet of recording media is not compatible, then discarding the pre-rendering, and rendering the image according to the identified media type;
        when the media type status flag is absent of any recognized media type, the media-type sensor identifies the media type of a sheet of recording media that the image will be printed upon before rendering the image.

11. The printing system claimed in claim 10, wherein the memory unit further includes a compatibility look-up table for media type compatibility with selected image rendering.

* * * * *